United States Patent
Eidloth et al.

(10) Patent No.: US 8,235,851 B2
(45) Date of Patent: Aug. 7, 2012

(54) TENSIONING OR DEFLECTOR PULLEY IN PARTICULAR FOR THE BELT DRIVE ON AN INTERNAL COMBUSTION ENGINE

(75) Inventors: Rainer Eidloth, Herzogenaurach (DE); Rainer Schenk, Fuerth (DE); Georg Goppelt, Pfofeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 775 days.

(21) Appl. No.: 12/300,821

(22) PCT Filed: May 10, 2007

(86) PCT No.: PCT/DE2007/000853
§ 371 (c)(1),
(2), (4) Date: Nov. 14, 2008

(87) PCT Pub. No.: WO2007/131479
PCT Pub. Date: Nov. 22, 2007

(65) Prior Publication Data
US 2009/0098967 A1  Apr. 16, 2009

(30) Foreign Application Priority Data
May 16, 2006  (DE) .......................... 10 2006 022 766

(51) Int. Cl.
*F16H 7/20*  (2006.01)
(52) U.S. Cl. ....................................... 474/199
(58) Field of Classification Search ........... 474/199; 384/477, 478, 484, 485, 486, 491, 568
See application file for complete search history.

(56) References Cited

U.S. PATENT DOCUMENTS

| 4,792,243 A | 12/1988 | Takeuchi | |
| 7,108,623 B2 * | 9/2006 | Cadarette et al. | 474/199 |
| 2002/0086754 A1 * | 7/2002 | Fukuwaka et al. | 474/199 |
| 2002/0141677 A1 * | 10/2002 | Murai et al. | 384/568 |
| 2004/0005102 A1 * | 1/2004 | Schmidt | 384/477 |

FOREIGN PATENT DOCUMENTS

| DE | 43 34 195 Y | 3/1994 |
| DE | 100 61 995 Y | 6/2002 |
| DE | 103 22 229 Y | 12/2004 |
| DE | 103 33 876 Y | 5/2005 |
| GB | 317 407 A | 8/1929 |

* cited by examiner

Primary Examiner — William A Rivera
Assistant Examiner — Robert T Reese
(74) Attorney, Agent, or Firm — Lucas & Mercanti, LLP; Klaus P. Stoffel

(57) ABSTRACT

The invention relates to a tensioning or deflector pulley, in particular for the belt drive on an internal combustion engine, essentially comprising a plastic or steel running pulley, formed by an inner hub ring, an outer running ring and a pulley disc, connecting both rings to each other, with a radial roller bearing fixed in the hub ring of the running pulley, made up of an inner bearing ring and an outer bearing ring with a number of rolling bodies running between the bearing rings in channeled running tracks, retained at regular separations from each other by a bearing cage with a seal to both sides of the roller bodies, by means of which the cavity, formed between the bearing rings and designed as a grease reservoir, is sealed.

8 Claims, 4 Drawing Sheets

TENSIONING OR DEFLECTOR PULLEY IN PARTICULAR FOR THE BELT DRIVE ON AN INTERNAL COMBUSTION ENGINE

This application is a 371 of PCT/DE2007/000853 filed Mai 10, 2007, which in turn claims the priority of DE 10 2006 022 766.2 filed Mai 16, 2006, the priority of both applications is hereby claimed and both applications are incorporated by reference herein.

FIELD OF THE INVENTION

The invention relates to a tensioning or deflector pulley according to the features of patent claim 1 which form the preamble, and it can advantageously be implemented, in particular, on tensioning or deflector pulleys arranged within a belt drive of an internal combustion engine or else on friction wheels for the decoupled water pump drive on internal combustion engines.

BACKGROUND OF THE INVENTION

It is known that the belt drive of an internal combustion engine serves for the drive of auxiliary assemblies of the motor vehicle, such as, for example, the generator, air conditioning compressor or water pump, and is designed, as a rule, as a belt drive driven by the crankshaft of the internal combustion engine. Since the individual auxiliary assemblies, as a consequence of their functions, are arranged offset with respect to one another on the internal combustion engine, the belt drive is provided with deflector pulleys for the belt which deflector pulleys are fastened rotatably to the internal combustion engine and which in each case ensure a sufficient looping around of the belt pulleys of the auxiliary assemblies. At the same time, the required tension of the belt is set with the aid of a tensioning pulley which is likewise fastened rotatably to the internal combustion engine at a pivoting arm acted upon by a spring force. Tensioning or deflector pulleys of this type consist essentially of a plastic or steel running roller which is formed essentially by an inner hub ring and an outer running ring and by a wheel disk connecting the two rings to one another, and of a radial rolling bearing which is fixed in position in the hub ring of the running roller and which consists of an inner bearing ring and an outer bearing ring and of a multiplicity of rolling bodies which roll between the bearing rings in groove-shaped raceways and which are held at uniform distances from one another by a bearing cage. Furthermore, the radial rolling bearing has axially on both sides of its rolling bodies one seal each by means of which the interspace between the bearing rings, which is designed as a grease repository, is sealed off.

Such a tensioning or deflector pulley is already known as generic, for example, from DE 100 61 995 A1. In the running roller disclosed in this publication, the radial rolling bearing is designed in the usual way as a single-row grooved ball bearing which is cast with its outer bearing ring into the hub ring of the running roller consisting of plastic. The rolling bodies of this grooved ball bearing in this case consist of a defined number of bearing balls which roll in groove-shaped raceways in the inner and in the outer bearing ring and which are held at uniform distances from one another by means of a bearing cage. The interspace between the bearing rings which is designed as a grease repository is sealed off by means of what is known as a two-stage seal, the first stage of which consists in each case of a reinforced lip seal and the second stage of which is formed in each case by a further sealing disk axially preceding the first stage with an annular sealing gap.

The lip seals are thus in each case fixed in position in an annular slot at the outermost margin in the inside of the outer bearing ring and, brushing via an elastic sealing lip, are supported in each case in a peripheral slot at the outermost margin in the outside of the inner bearing ring of the radial rolling bearing. By contrast, the further sealing disk is designed as a separate annular metal disk which is plugged with its inside diameter on a head-side centering extension of the fastening screw of the running roller and which is braced between the inner bearing ring and the screw head of the fastening screw. At the same time, the sealing disk extends radially over the entire height of the interspace between the bearing rings of the radial rolling bearing and on its outer circumference has an elastic sealing lip which is supported on the axial end face of the outer bearing ring.

The disadvantage of this known tensioning pulley, however, is that the grooved ball bearing used for its mounting, particularly on high-performance and high-torque internal combustion engines, comes up against the limits of its load-bearing capacity more and more often due to the high operating forces and is consequently subjected to increased wear, because of which the grooved ball bearing has to be exchanged prematurely. The cause of the limited load-bearing capacity of such a grooved ball bearing is in this case to be seen in the limited number of mountable bearing balls which, in such bearings, are introduced by what is known as the eccentric mounting method, in which the two bearing rings are arranged eccentrically to one another, the free space thereby occurring between the bearing rings is filled with the bearing balls, and, thereafter, the inner bearing ring is brought into the position concentric to the outer bearing ring, utilizing the elasticity of the two bearing rings. Finally, the bearing balls are distributed uniformly in the raceways of the bearing rings, and the bearing cage is inserted, and therefore it is, as a matter of course, impossible to fill the bearing fully with bearing balls by means of this mounting method.

Even the obvious possibility of increasing the load-bearing capacity of the tensioning or deflector pulley using two-row grooved ball bearings is limited, mostly because of construction space, at least in passenger vehicles, and therefore two-row grooved ball bearings are employed preferably for the tensioning and deflector pulleys of the belt drive of commercial vehicles, but, even in these, often come up against the limits of their load-bearing capacity because of increasingly higher-performance internal combustion engines.

It is also a disadvantage, in the grooved ball bearing used in the known tensioning pulley, that its available grease repository for lubricating the bearing has a relatively small design. Since, as a consequence of construction, no relubrication possibilities are provided for the radial rolling bearings of tensioning and deflector pulleys, the useful life of the grooved ball bearing is therefore also dependent on the size or possible period of use of the existing grease repository. The size of the grease repository is in this case defined by the free volume of the interspace between the bearing rings which, in the grooved ball bearing used, is reduced considerably due to the volume of the bearing balls and of the bearing cage and, at least in grooved ball bearings with standard dimensions, also cannot be extended without major expenditure.

Finally, even the two-stage sealing of the grooved ball bearing of the known tensioning pulley has proved to be a disadvantage in that the further sealing disks preceding the inner lip seals are designed as separate individual parts which are delivered together with the tensioning pulley and constitute the intended functional unit with the lip seals only when the tensioning pulley is being screwed to the internal combustion engine by the final manufacturer. However, such designs in a differential type of construction no longer conform to the present-day requirements of the automotive industry in terms of system solutions from the supply industry, whereby, in this particular case, the tensioning pulley is designed as an integral component with all seals, which merely has to be finally mounted as a functioning module on the internal combustion engine.

OBJECT OF THE INVENTION

Proceeding from the outlined disadvantages of the known prior art, the object on which the invention is based, therefore, is to design a tensioning or deflector pulley, in particular for the belt drive of an internal combustion engine, which is mounted on a radial rolling bearing with standard dimensions which has increased load-bearing capacity and an enlarged grease repository and is therefore distinguished by lower wear and an increased useful life, and which additionally has a seal, designed in an integral type of construction, of the interspace between the bearing rings.

DESCRIPTION OF THE INVENTION

According to the invention, in a tensioning or deflector pulley, this object is achieved in that the radial rolling bearing is designed as a spherical roller bearing. The rolling bodies of the radial rolling bearing are designed as spherical rollers with two side faces flattened symmetrically from a basic spherical shape and arranged parallel to one another. The spherical roller bearing has, in relation to a comparable ball bearing, an increased load-bearing capacity due to the higher number of mountable rolling bodies and, at the same time, an enlarged grease repository due to the reduced construction space of the rolling bodies.

Preferred embodiments and advantageous developments of the tensioning or deflector pulley designed according to the invention are described in the subclaims.

Thus, in the tensioning or deflector pulley designed according to the invention, there is provision for the rolling bodies of the radial rolling bearing which are designed as spherical rollers to have preferably a width between their side faces of about 70% of their basic spherical shape. At the same time, the width of the raceways in the bearing rings likewise amounts to at least 70% of the diameter of the basic spherical shape of the spherical rollers, so that their running faces have, under radial load, one hundred percent linear contact with the raceways in the bearing rings. Designing the spherical rollers and the raceways with such a width has thereby proved appropriate, in practice, with regard to the radial and axial load-bearing capacity of the bearing and corresponds approximately to the contact area which the balls of conventional grooved ball bearings also have with their raceways in the bearing rings. The distance between the bearing rings has, correspondingly, a magnitude of about 80% of the diameter of the basic spherical shape of the rolling bodies, so that the spherical rollers can first be introduced axially into the radial rolling bearing in a horizontal position through the clearance between the bearing rings arranged concentrically to one another and can then be pivoted by a vertical and a horizontal rotation by 90.degree., each. Proceeding from this, therefore, one of the characterizing features of the tensioning or deflector pulley designed according to the invention is that the radial rolling bearing designed as a spherical roller bearing has, in relation to a comparable ball bearing, 30% to 40% more rolling bodies and a correspondingly higher load-bearing coefficient and, at the same time, due to the flattened side faces of the rolling bodies, a between 20% and 30% larger grease repository in the interspace between the bearing rings. At the same time, the higher number of rolling bodies makes it possible to have an up to three times higher load-bearing coefficient in relation to comparable ball bearings, while the larger grease repository additionally prolongs the useful life of bearings of this type by 1.3 to 1.5 times that of comparable ball bearings.

Furthermore, the set object with regard to sealing the interspace between the bearing rings is achieved, according to the invention, in that the seal, arranged axially on both sides of the rolling bodies of the radial rolling bearing, is preferably designed as a two-stage seal, the first stage of which consists in each case of a reinforced lip seal known per se, but the second stage of which is formed in each case by a further sealing disk axially preceding the first stage with an annular sealing gap and which can be preassembled, together with the lip seal, as a functional module by the tensioning pulley manufacturer.

The lip seals, preferably reinforced by a sheet metal or plastic ring and consisting of an elastomer, are thereby, on the one hand each fixed in position in an annular slot in the inside of the outer bearing ring, which annular slot can be arranged, offset slightly axially inward with respect to the rolling bodies, due to the narrow design of the rolling bodies. On the other hand, in a likewise known way, the lip seals, brushing via one or more elastic sealing lips, are each supported in a peripheral slot in the outside of the inner bearing ring of the radial rolling bearing, which peripheral slot is likewise arranged so as to be offset slightly with respect to the rolling bodies.

By contrast, the further sealing disks of the seal, which are preferably produced from a metallic material in a non-cutting manner, have a simple annular shape, with each an annular rim, which is located on the inside-diameter side and by means of which the sealing disks are fastened, preferably nonpositively, on the marginal portions of the outside of the inner bearing ring which are free due to the fact that the lip seals are offset inward. The annular rim on the sealing disks is thereby advantageously arranged so as to point to the axial sides of the radial rolling bearing and to be flush with these, so that the sealing disks can be fastened in a particularly cost-effective way by being pressed onto the inner bearing ring, and they form an integral component of the tensioning or deflector pulley.

Finally, as an advantageous embodiment of the inclined rolling bearing designed according to the invention, it is also proposed that the further sealing disks of the seal extend radially virtually over the entire magnitude of the distance between the bearing rings and, to improve the sealing action, selectively also have on the outside-diameter side additional elastic sealing lips which are connected sealingly to the marginal portions of the inside of the outer bearing ring which are free due to the fact that the lip seals are offset inward. If even a water-resistant fordable seal of the radial rolling bearing is thereby to be achieved, it is also optionally possible, furthermore, to additionally insert into the annular sealing gaps between the lip seals and the sealing disks of the seal, in a known way, a continuous grease bead or felt ring which at least partially fills the sealing gap.

The tensioning or deflector pulley designed according to the invention thus has the advantage, as compared with the tensioning or deflector pulleys known from the prior art, that it is mounted on a radial rolling bearing designed as a spherical roller bearing, with standard dimensions, which, due to the increased number and the narrow type of construction of the mountable rolling bodies, has a substantially higher load-bearing capacity and, at the same time, an enlarged grease repository in relation to a comparable ball bearing and which is therefore distinguished by lower wear and an increased useful life. In addition, the spherical roller bearing of the tensioning or deflector pulley designed according to the invention has a seal of the interspace between the bearing rings, which seal is designed in an integral type of construction and can be preassembled, complete, by the tensioning pulley manufacturer and, optionally, designed to be fordable.

BRIEF DESCRIPTION OF THE DRAWINGS

The tensioning or deflector pulley designed according to the invention is explained in more detail below by means of two preferred embodiments, with reference to the accompanying drawings in which.

DETAILED DESCRIPTION OF THE DRAWINGS

Figure 1:
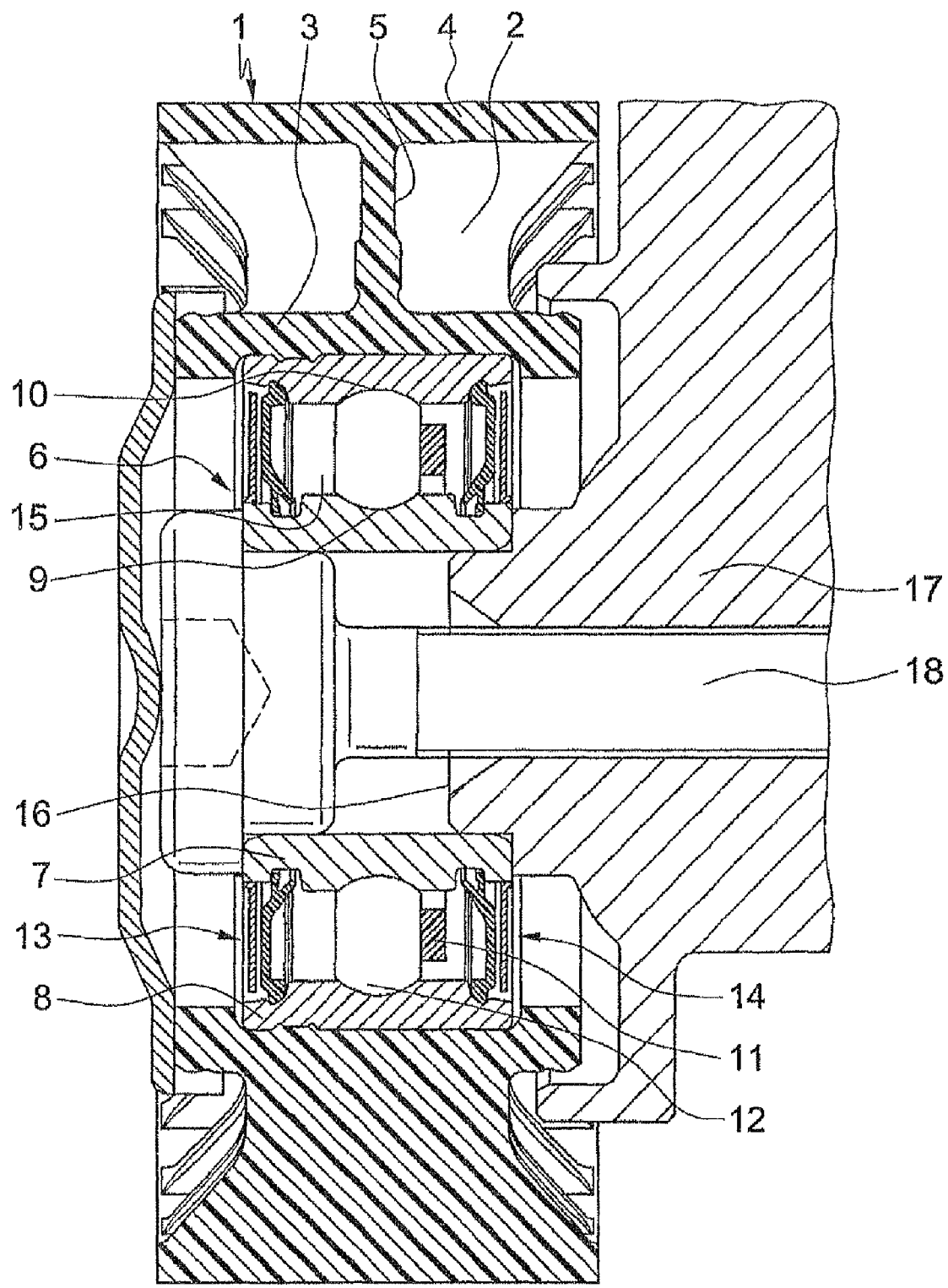
FIG. 1 shows a cross section through a tensioning pulley designed according to the invention, mounted on a single-row spherical roller bearing.
Figure 2:
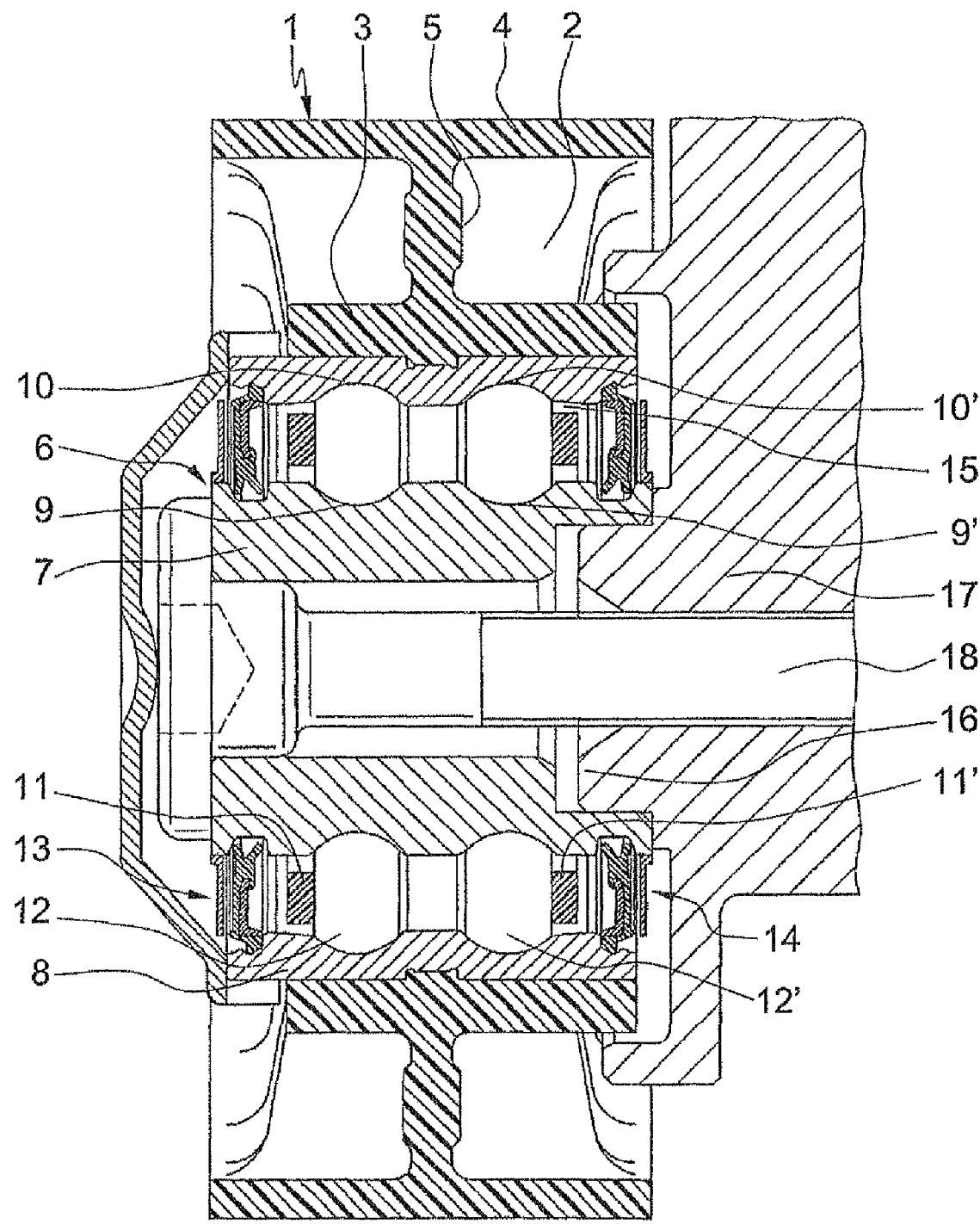
FIG. 2 shows a cross section through a tensioning pulley designed according to the invention, mounted on a two-row spherical roller bearing.

A tensioning pulley 1 for the belt drive of an internal combustion engine may be gathered clearly from FIGS. 1 and 2 each and has a plastic or steel running roller 2 which is formed essentially by an inner hub ring 3 and an outer running ring 4 and by a wheel disk 5 connecting the two rings 3, 4 to one another. Furthermore, one radial rolling bearing 6 each is fixed in position in the hub ring 5 of the running rollers 2 depicted, which rolling bearing consists of an inner bearing ring 7 and an outer bearing ring 8 and of a multiplicity of rolling bodies 12 or 12, 12' which are arranged between the bearing rings 7, 8 and which roll either in one row in groove-shaped raceways 9, 10 or in two rows in groove-shaped raceways 9, 9', 10, 10' and are held at uniform distances from one another by means of a bearing cage 11 or two bearing cages 11, 11'. Moreover, each radial rolling bearing 6 has axially on both sides of its rolling bodies 12 or 12, 12' in each case a seal 13, 14, by means of which the interspace 15 between the bearing rings 7, 8, which is designed as a grease repository, is sealed. As can be seen clearly, the tensioning pulleys 1 are then fastened in each case via the inner bearing ring 7 of their radial rolling bearings 6 which is centered on a receptacle 16 of a housing 17 and which is screwed to this housing by means of a fastening screw 18.

Furthermore, it may be gathered from FIGS. 1 and 2 that the radial rolling bearings 6 shown are in each case designed, according to the invention, as spherical roller bearings, the rolling bodies 12 or 12, 12' of which are designed as spherical rollers, each with two side faces 19, 20 or 19, 19', 20, 20' flattened symmetrically from a basic spherical shape and arranged parallel to one another. These rolling bodies 12 designed as spherical rollers have a width between their side faces 19, 20 or 19, 20 and 19', 20' of about 70% of the diameter of their basic spherical shape and are first introduced axially into the radial rolling bearing 6 in a horizontal position, between the bearing rings 7, 8 arranged concentrically to one another, through the clearance 21 having a magnitude of about 80% of the diameter of the basic spherical shape of the rolling bodies 12 and are then pivoted by a vertical and a horizontal rotation by 90° each, into the raceways 9, 10 of the bearing ring 7, 8. This mounting possibility and the flattened side faces 19, 20 or 19, 20 and 19', 20' of the rolling bodies 12 have the effect that the radial rolling bearings 6 designed as spherical roller bearings have, in relation to comparable ball bearings, 30% to 40% more rolling bodies 12 and a correspondingly higher load-bearing coefficient and, at the same time, a between 20% and 30% larger grease repository in the interspace 15 between the bearing rings 7, 8.

Figure 3:
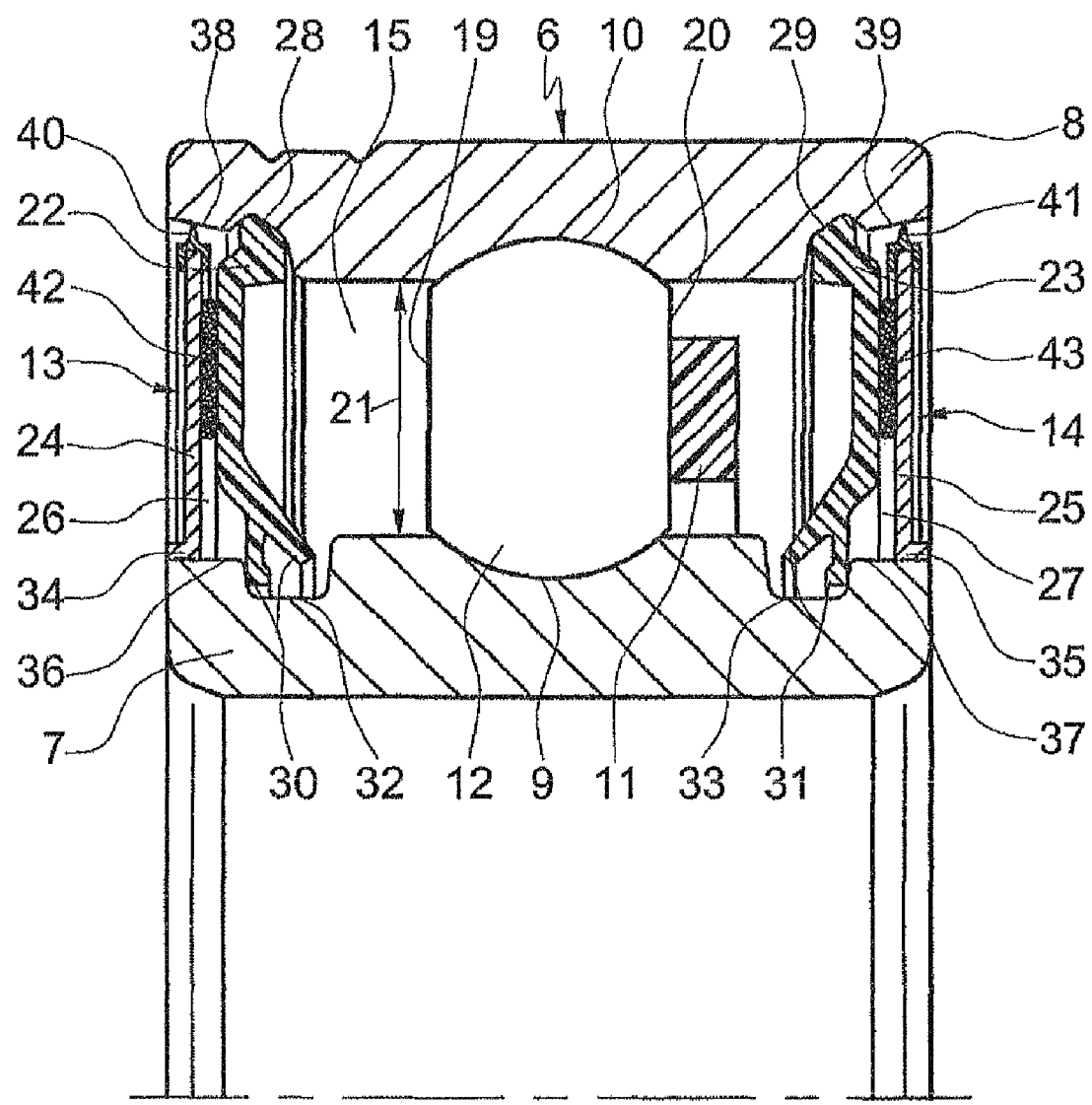
FIG. 3 shows an enlarged illustration of a cross-sectional half of the single-row spherical roller bearing according to FIG. 1.
Figure 4:
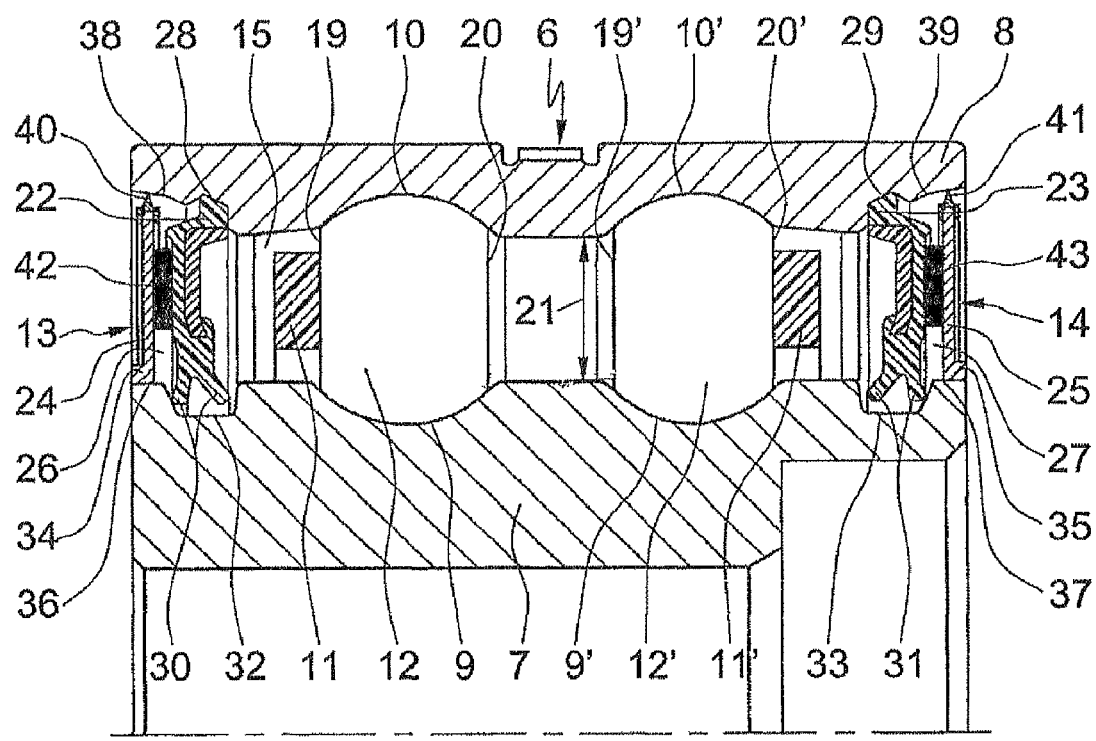
FIG. 4 shows an enlarged illustration of a cross-sectional half of the two-row spherical roller bearing according to FIG. 2.

Furthermore, it becomes clear from FIGS. 3 and 4 that the seal 13, 14, arranged axially on both sides of the rolling bodies 12, of the radial rolling bearings 6 is designed in each case as a premountable two-stage seal, the first stage of which consists in each case of a reinforced lip seal 22, 23 and the second stage of which is formed in each case by a further sealing disk 24, 25 axially preceding the first stage with an annular sealing gap 26, 27. The lip seals 22, 23, reinforced by a metal or plastic ring not designated in any more detail, are at the same time each fixed in position in an annular slot 28, 29, offset axially inward with respect to the rolling bodies 12, in the inside of the outer bearing ring 8 and, brushing via a plurality of elastic sealing lips 30, 31, are each supported in a peripheral slot 32, 33 in the outside of the inner bearing ring 7 of the radial rolling bearing 6.

By contrast, the further sealing disks 24, 25 of the seal 13, 14, which are produced from a metallic material in a non-cutting manner, have an annular shape, in each case with an annular rim 34, 35 which is located on the inside-diameter side and by means of which the sealing disks 24, 25 are pressed onto the marginal portions 36, 37 of the outside of the inner bearing ring 7 which are free due to the fact that the lip seals 22, 23 are offset inward. As can be seen clearly, these further sealing disks 24, 25 of the seal 13, 14 extend radially at the same time virtually over the entire magnitude of the distance 21 between the bearing rings 7, 8 and additionally have on the outside-diameter side elastic sealing lips 40, 41 which are connected sealingly to the marginal portions 38, 39 of the inside of the outer bearing ring 8 which are free due to the fact that the lip seals 22, 23 are offset inward. In addition, a continuous grease bead 42, 43 is inserted into the annular sealing gap 26, 27 between the lip seals 22, 23 and the sealing disks 24, 25 of the seal 13, 14 and at least partially fills the sealing gap 26, 27 and gives rise to a water-resistant fordable seal 13, 14 of the radial rolling bearing 6.

LIST OF REFERENCE NUMERALS

1 Tensioning pulley
2 Running roller
3 Hub ring of 2
4 Running ring of 2
5 Wheel disk of 2
6 Radial rolling bearing
7 Inner bearing ring of 6
8 Outer bearing ring of 6
9, 9' Raceway in 7
10, 10' Raceway in 8
11, 11' Bearing cage of 6
12, 12' Rolling body of 6
13 Seal of 6
14 Seal of 6
15 Interspace between 7 and 8
16 Receptacle
17 Housing
18 Fastening screw
19, 19' Side face of 12, 12'

20, 20' Side face of 12, 12'
21 Distance between 7 and 8
22 Lip seal of 13
23 Lip seal of 14
24 Sealing disk of 13
25 Sealing disk of 14
26 Sealing gap between 22 and 24
27 Sealing gap between 23 and 25
28 Annular slot for 22
29 Annular slot for 23
30 Sealing lips of 22
31 Sealing lips of 23
32 Peripheral slot for 30
33 Peripheral slot for 31
34 Annular rim on 24
35 Annular rim on 25
36 Free marginal portion of 7
37 Free marginal portion of 7
38 Free marginal portion of 8
39 Free marginal portion of 8
40 Sealing lip on 24
41 Sealing lip on 25
42 Grease bead in 26
43 Grease bead in 27

The invention claimed is:

1. A tensioning or deflector pulley for a belt drive of an internal combustion engine, comprising:
   a plastic or steel running roller, which is formed by an inner hub ring and an outer running ring and a wheel disk connecting the two rings to one another;
   a radial rolling bearing which is fixed position radially within the hub ring of the running roller, the radial rolling bearing having an inner bearing ring, with a first groove-shaped raceway, an outer bearing ring, with a second groove-shaped raceway and a multiplicity of rolling bodies rolling between the bearing rings in the groove-shaped raceways;
   a bearing cage holding the rolling bodies at uniform distances from one another;
   a seal axially spaced from the rolling bodies at both sides of the rolling bodies so as to seal an interspace, which is designed as a grease repository, between the bearing rings the seal includes a reinforced lip seal and a sealing disk axially spaced from the reinforced lip seal, the sealing disk has an elastic sealing lip at one end which contacts the outer bearing ring and only an axially outwardly extending rim at another end which contacts the inner ring,
   wherein the radial rolling bearing is a spherical roller bearing, and the rolling bodies are spherical rollers with two side faces flattened symmetrically from a basic spherical shape and arranged parallel to one another, the spherical roller bearing having, in relation to a comparable ball bearing, an increased load-bearing capacity due to a greater number of mountable rolling bodies and, simultaneously, an enlarged grease repository due to a reduced construction space of the rolling bodies.

2. The pulley as claimed in claim 1, wherein the rolling bodies of the radial rolling bearing, which are spherical rollers, have a width between the side faces of about 70% of a diameter of a basic spherical shape and can first be introduced axially into the radial rolling bearing through a clearance, having a magnitude of about 80% of the diameter of the basic spherical shape of the rolling bodies, between the bearing rings arranged concentrically to one another and can be pivoted by a vertical and a horizontal rotation by 90° each into the raceways of the bearing rings.

3. The pulley as claimed in claim 1, wherein the roller bearing has, in relation to a comparable ball bearing having standard rolling bodies, 30% to 40% more rolling bodies and a correspondingly higher load-bearing coefficient than the comparable ball bearing and at the same time, due to the flattened side faces of the rolling bodies, a between 20% and 30% larger grease repository in the interspace between the bearing rings than the comparable ball bearing.

4. The pulley as claimed in claim 1, wherein the seal, arranged axially on both sides of the rolling bodies of the radial rolling bearing is a premountable two-stage seal, in a first stage, a first of the stages being the first reinforced lip seal and in a second stage, the a second of the stages being the sealing disk axially outward of the reinforced lip seal with an annular sealing gap formed between the reinforced lip seal and the sealing disk.

5. The pulley as claimed in claim 4, wherein the outer bearing ring has an inner surface with annular slots, the inner bearing ring has an outer surface with peripheral slots, and the reinforced lip seal, which is reinforced by a metal or plastic ring, is offset axially in a direction of the rolling bodies and fixed in position, in each case, in one of the annular slots of the outer bearing ring, and, the reinforced lip seal brushes the peripheral slot of the inner bearing ring, via one or more elastic sealing lips, which are arranged so as to be supported, in each case, in the peripheral slot of the inner bearing ring of the radial rolling bearing.

6. The pulley as claimed in claim 4, wherein the inner bearing ring has marginal portions on an outside surface of the inner bearing ring, which are free as a result of each reinforced sealing being offset axially inward of the marginal portions, and the sealing disks of the seal, which are produced from a metallic material in a non-cutting manner, have an annular shape annular and the rim is arranged on the marginal portions of the inner bearing ring.

7. The pulley as claimed in claim 6, wherein the outer bearing ring has marginal portions on an inside surface of the outer bearing ring, which are free as a result of each reinforced sealing lip being offset axially inward of the marginal portions, the sealing disks of the seal extend radially virtually over an entire magnitude of a distance between the bearing rings and on an outside-diameter side each reinforced elastic sealing lip is connected sealingly to the marginal portions of the inside surface of the outer bearing ring.

8. The pulley as claimed in claim 7, wherein, the seal is a water-resistant fordable seal, and the radial roiling bearing further comprises a continuous grease bead or felt ring, which at least partially fills the annular sealing gap and is inserted into the annular sealing gap between each reinforced lip seal and each sealing disk of the seal.

* * * * *